(12) United States Patent
Tsuji et al.

(10) Patent No.: US 6,234,678 B1
(45) Date of Patent: May 22, 2001

(54) PLAIN BEARING

(75) Inventors: Hideo Tsuji; Hideo Ishikawa; Takayuki Shibayama, all of Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/172,131

(22) Filed: Oct. 14, 1998

(30) Foreign Application Priority Data

Dec. 20, 1997 (JP) .................................... 9-364953

(51) Int. Cl.$^7$ ...................................... F16C 33/12
(52) U.S. Cl. .................. 384/276; 384/273; 384/294; 384/625
(58) Field of Search .................. 384/625, 276, 384/273, 294, 288

(56) References Cited

U.S. PATENT DOCUMENTS 4,073,550 * 2/1978 Yahraus .

FOREIGN PATENT DOCUMENTS 3219098 9/1991 (JP) .
4331817 11/1992 (JP) .

* cited by examiner

*Primary Examiner*—Lenard A. Footland
(74) *Attorney, Agent, or Firm*—Browdy and Neimark, PLLC

(57) ABSTRACT

There is provided a plain bearing in which 0.3 to 25 vol. % of hard particles, having a mean particle diameter of not more than 1.5 $\mu$m, are dispersed in a main load portion of the overlay, so that the main load portion is formed into a hard region harder than the other portion of the overlay. With this construction, the main load portion is enhanced in wear resistance while the other portion is enhanced in foreign matter embeddability. Therefore, there is provided the plain bearing which is less liable to undergo seizure due to abnormal wear even if solid foreign matter are included into lubricating oil, thus exhibiting excellent wear resistance and foreign matter embeddability.

9 Claims, 4 Drawing Sheets

PLAIN BEARING

BACKGROUND OF THE INVENTION

This invention relates to a plain bearing, and more particularly to a plain bearing for use with a shaft which bearing has a specified portion in a circumferential direction to which a shaft load is applied in a concentrated manner.

There is well known a plain bearing in which an overlay, composed of Pb, Sn, Al, or an alloy comprising one of these substances as a main component, is formed on a surface of a bearing alloy layer so as to enhance the conformability and foreign matter embeddability, thereby imparting an excellent anti-seizure property to the plain bearing. There has been proposed a technique in which hard particles are included in this overlay so as to enhance its wear resistance, and such a technique is disclosed, for example, in JP-A-3-219098 and JP-A-4-331817 filed by the Applicant of the present application.

JP-A-3-219098 discloses a plain bearing in which 0.3 to 25 vol. % of inorganic hard particles, having a particle diameter of not more than 15 μm, are added to an overlay of Pb base alloy, thereby imparting excellent wear resistance to the plain bearing.

JP-A-4-331817 discloses a plain bearing in which inorganic hard particles have a mean particle diameter of not more than 1.5 μm, and an overlay has surface roughness of not more than Rz 4 μm, and by doing so, an anti-seizure property and fatigue resistance are enhanced without adversely affecting wear resistance.

One of a major cause of a breakdown of a plain bearing, used in an internal combustion engine, is the inclusion or intrusion of solid foreign matters such as dirt and wear debris into lubricating oil, in which case abnormal wear develops in the plain bearing, thereby causing seizure.

Recently, there has been a demand for a plain bearing of the type which can exhibit excellent foreign matter embeddability even upon inclusion of solid foreign matters into lubricating oil. There is also known a plain bearing having an explosion load-receiving region to which a load is applied in a concentrated manner, and its representative example is a plain bearing used at a big end portion of a diesel engine.

SUMMARY OF THE INVENTION

It is therefore an object of this invention to provide a plain bearing in which in view of the difference in required properties between portions of the plain bearing disposed in a direction of a circumference thereof, that portion of the bearing for receiving or bearing an axial load is enhanced in wear resistance while the other portion is enhanced in foreign matter embeddability, so that the plain bearing can exhibit excellent wear resistance and foreign matter embeddability as a whole.

According to the feature of the present invention, 0.3 to 25 vol. % of hard particles, having a mean particle diameter of not more than 1.5 μm, are dispersed in a main load portion of an overlay, so that the main load portion is formed into a hard region harder than the other portion of the overlay.

Although Al alloy, Cu alloy or white metal can be used as a bearing alloy, Al alloy or Cu alloy is usually used particularly in the plain bearing for use in an internal combustion engine. Although bimetal, formed by bonding a bearing alloy to a backing metal, is extensively used, the plain bearing can be composed solely of a bearing alloy layer.

Soft metal, composed of Pb, Sn, Al, or an alloy comprising one of these substances as a main component, is used as the overlay, and one of these materials is suitably selected. The thickness of the overlay is usually 10 to 30 μm in the case of the plain bearing for an automobile engine, and is 50 to 100 μm in the case of the plain bearing for an internal combustion engine of a ship, and this thickness is suitably selected according to use.

Examples of the hard particles include nitride (e.g. BN, TiN and $Si_3N_4$), carbide (e.g. SiC, TiC, $B_4C$ and TaC), fluoride (e.g. CF and $CaF_2$), sulfide (e.g. $MoS_2$ and $WS_2$) and the others. Preferably, the hard particles are harder than an overlay matrix, but the degree of hardness is not always restricted.

It is necessary that the hard particles should be dispersed in the overlay, and if the particle diameter of the hard particles is large, the fatigue resistance is lowered, and therefore the mean particle diameter thereof should be not more than 1.5 μm. For example, in a plain bearing used at a big end portion of a diesel engine, the thickness of the overlay is thin on the order of 10 to 30 μm, and therefore in order to obtain a low initial frictional coefficient, the mean particle diameter of the hard particles should preferably be not more than 1.5 μm.

The content of the hard particles in the hard region of the overlay should be 0.3 to 25 vol. %. If this content is less than 0.3 vol. %, the intended effect can not be obtained by the addition of the hard particles. In contrast, if this content is more than 25 vol. %, the fatigue resistance is lowered. The content of 0.5 to 20 vol. % is particularly preferred.

The term "main load portion" means that region which receives the axial load in a concentrated manner. This will be explained, for example, with reference to FIG. 7 showing a big end portion of a diesel engine. A plain bearing 10 is mounted on a connecting rod 11, and rotatably supports a shaft 12. A cap 13 is fixedly secured by bolts 14 to a big end portion of the connecting rod 11, and these portions jointly constitute a housing. In this example shown in FIG. 7, a large axial load or explosion load, is applied to an upper portion as indicated by arrow A. A main load portion M is disposed at an upper portion of the plain bearing. Thus, the plain bearing does not receive the axial load uniformly over the entire circumference thereof. The axial load is concentrated on a specified (localized) portion of the plain bearing, and is not applied to the other region or portion of the plain bearing. At the main load portion, the shaft and the overlay are partially brought into metal-to-metal contact with each other by the intermittent explosion load, so that wear of the contact portions proceeds. Therefore, the main load portion is formed into the hard region having excellent wear resistance.

The other portion is constituted by the overlay composed of soft metal, and therefore exhibits excellent foreign matter embeddability.

The hard region can be formed on the overlay by suitably using a plating method, a sputtering method or a pressure bonding method. For example, a plating method, disclosed in JP-A-3-219098, can be used. Using this method, a plating solution, having hard particles dispersed therein, is spouted toward the relevant portion to be formed into the hard region, thereby forming the hard region having the hard particles dispersed therein, whereas the content of the hard particles is low at the other portion.

As described above, according to the feature of the present invention, 0.3 to 25 vol. % of hard particles, having a mean particle diameter of not more than 1.5 μm, are dispersed in the main load portion of the overlay, so that the main load portion is formed into the hard region harder than the other portion, and by doing so, there can be provided the plain bearing having excellent wear resistance and excellent foreign matter embeddability.

DESCRIPTION OF THE INVENTION

A preferred embodiment of the present invention, directed to a semi-cylindrical half bearing 1 used at a big end portion of a diesel engine, will now be described in detail.

Figure 1:
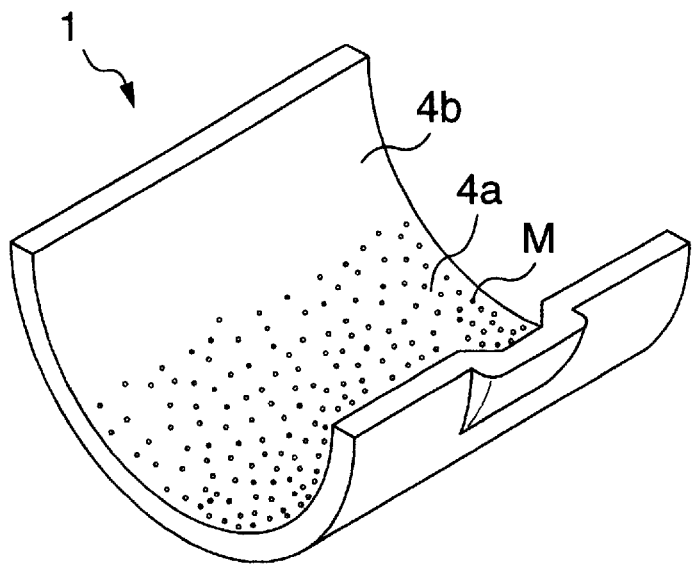
FIG. 1 shows a perspective view of a half bearing of the present invention.
Figure 2:
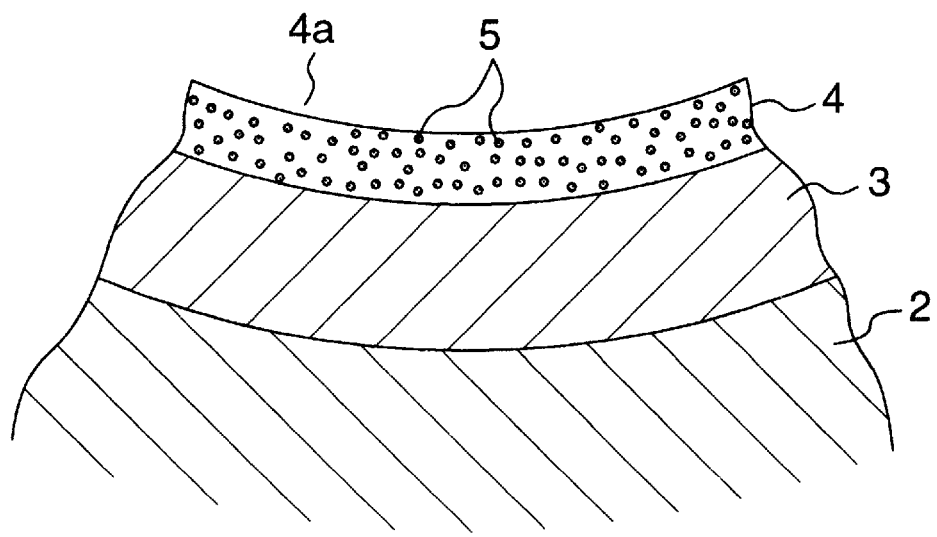
FIG. 2 shows an enlarged, cross-sectional view of a portion of the half bearing.
Figure 3:
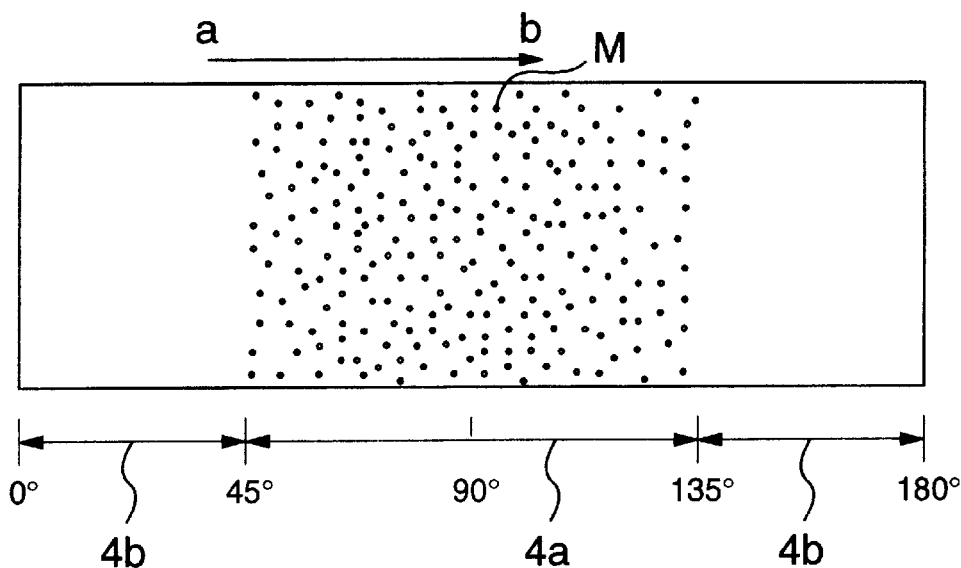
FIG. 3 shows a schematic, developed view of the half bearing.

As shown in FIGS. 1 to 3, a bearing alloy layer 3, composed of Cu alloy, is formed on an inner surface of a backing metal 2 of the half bearing 1, and an overlay 4, composed of Pb alloy, is formed on an inner surface of the bearing alloy layer 3 (see FIG. 2). As shown in FIG. 3 which is a developed view of the half bearing 1, the overlay 4 includes a hard region 4a having hard particles 5 (composed of $Si_3N_4$) dispersed therein, and this hard region 4a extends right and left by the width of 45° from a central position illustrative of 90° at which a main load portion M is disposed.

A method of producing this half bearing 1 will now be described. Powder of copper-lead alloy (Cu-23Pb-3.5Sn) is applied to one side or face of a steel sheet serving as the backing metal 2, and then the steel sheet is sintered and rolled, thereby forming the bearing alloy layer 3 composed of the copper-lead alloy. Then, the steel sheet is cut into pieces or strips of a rectangular shape, and then each of these cut pieces is bent into a semi-cylindrical shape. Thereafter, the overlay 4 of the Pb base alloy is formed on the bearing alloy layer 3 by plating.

In the step of plating the overlay 4, each of the cut sheet sheet pieces, after bent into the semi-cylindrical shape, is degreased and pickled, and subsequently is subjected to forming a Ni layer having a thickness of 1.5 μm on a surface of the sintered layer by using a Watt Ni-plating bath at a cathode current density of $6A/dm^2$ under the bath temperature of 50° C.

Then, each of the sheet pieces is subjected to plating in a borofluoride lead alloy plating bath which is well known as a Pb alloy-plating method. At this time, in order that the hard particles 5 can be dispersed in the overlay of the Pb alloy, a plating solution, having particles of $Si_3N_4$ (which serve as the hard particles 5, and have a mean particle diameter of 0.6 μm) dispersed therein in an amount of 10 to 40 g/l, is used in the borofluoride lead alloy plating bath. Also, in order that the hard region 4a can be formed at the central portion (which corresponds to the position illustrative of 90° in FIG. 3) which forms the main load portion M (see FIG. 1), the plating is carried out while stirring the plating solution in such a manner that the plating solution in the plating bath is applied in a jet to this main load portion M in a concentrated manner. The plating is effected at a cathode current density of 3 to $5A/dm^2$ under the bath temperature of 25° C. As a result, the overlay, having a thickness of 20 μm, is formed. In this manner, there is formed the overlay 4 which has the hard region 4a, having the hard particles 5 dispersed therein, and the other portions 4b having the hard particles 5 hardly dispersed therein.

Figure 4:
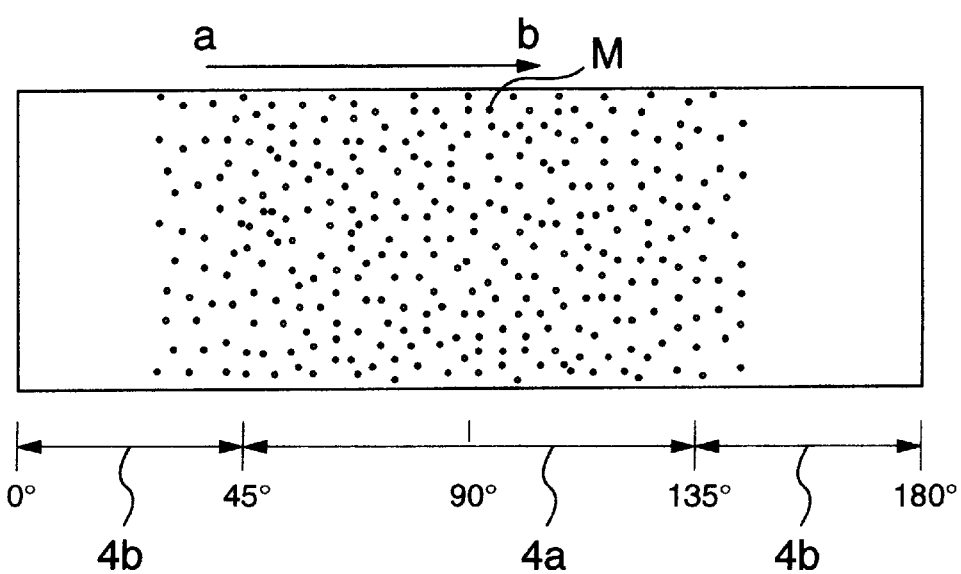
FIG. 4 shows a view similar to FIG. 3, but showing another embodiment of a modified half bearing.
Figure 5:
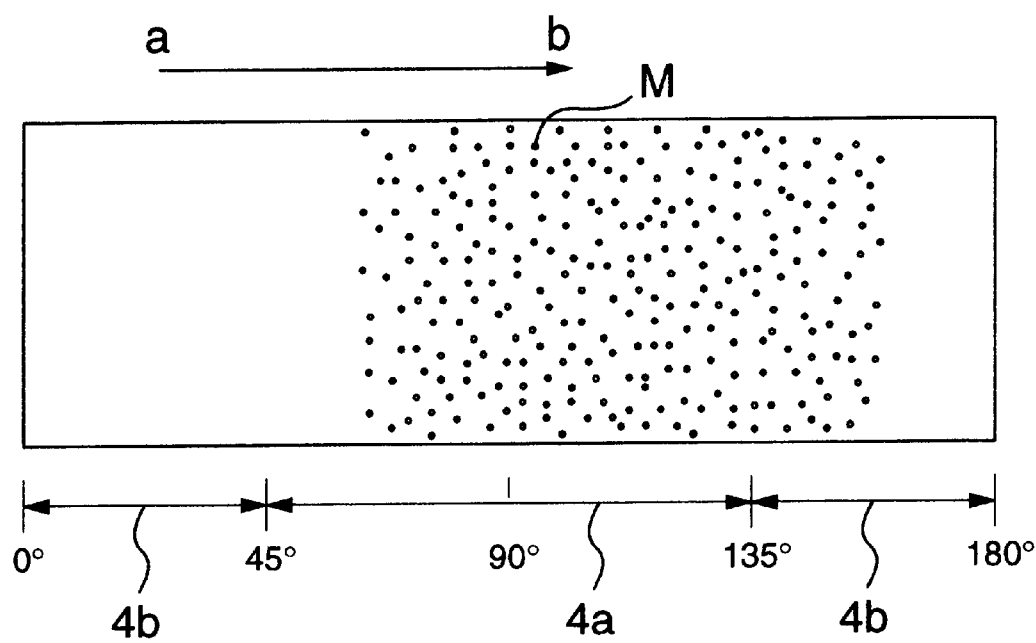
FIG. 5 shows a view similar to FIG. 3, but showing another embodiment of the modified half bearing.

The width and position of the hard region 4a to be formed can be adjusted by the plating solution-stirring condition. FIG. 4 shows an embodiment in which a hard region 4a is formed over a wider range or area as compared with an embodiment of FIG. 3. FIG. 5 shows an embodiment in which with respect to a sliding direction from a to b, that portion of a hard region 4a, disposed on one side a of a main load portion M (disposed at a position illustrative of 90°), is smaller in width. This construction is provided, taking it into consideration that the foreign matter embeddability is required particularly at this side a rather than at the main load portion M.

In order to confirm the performance of the above embodiment, samples of Examples and Comparative Examples, each having an overlay composed of Pb alloy or Sn alloy, were prepared, and a foreign matter embeddability test was carried out.

The test was carried out for Examples 1 to 7 and Comparative Examples 1 to 3, and with respect to these Examples and Comparative Examples, the composition of soft metal, constituting the overlay matrix, as well as the content of the hard particles, are shown in Table 1. Examples 1, 5 and 6 correspond to the hard region (having the hard particles) shown in FIG. 3, Examples 2 and 7 correspond to the hard region shown in FIG. 4, and Examples 3 and 4 correspond to the hard region shown in FIG. 5.

TABLE 1

| | | Composition of Soft Metal (wt. %) | | | | Content of Hard Particles in Various Portions of Bearing (vol. %) | | | | | | | | | Corresponding Figure |
|---|---|---|---|---|---|---|---|---|---|---|---|---|---|---|---|
| | | Pb | Sn | In | Cu | 10° | 30° | 50° | 70° | 90° | 110° | 130° | 150° | 170° | |
| Example | 1 | Rem | 10 | 10 | — | 0 | 0 | 0.5 | 1.8 | 2.0 | 1.7 | 0.5 | 0 | 0 | 3 |
| | 2 | Rem | 10 | 10 | — | 0.1 | 0.2 | 0.7 | 1.5 | 1.5 | 1.4 | 0.7 | 0.2 | 0 | 4 |
| | 3 | Rem | 10 | 10 | — | 0 | 0.1 | 1.1 | 1.3 | 1.5 | 1.1 | 1.0 | 1.2 | 0.1 | 5 |
| | 4 | Rem | 10 | 10 | 2 | 0 | 0 | 0.5 | 1.0 | 2.5 | 1.5 | 0.9 | 0.5 | 0.2 | 5 |
| | 5 | Rem | 10 | 10 | 2 | 0 | 0.1 | 0.8 | 1.2 | 1.8 | 1.4 | 0.7 | 0 | 0 | 3 |
| | 6 | — | Rem | — | 2 | 0 | 0 | 0.7 | 1.1 | 1.5 | 1.4 | 0.8 | 0 | 0 | 3 |
| | 7 | — | Rem | — | 2 | 0.1 | 0.1 | 0.9 | 1.5 | 1.8 | 1.4 | 0.9 | 0.2 | 0 | 4 |

TABLE 1-continued

| | | Composition of Soft Metal (wt. %) | | | | Content of Hard Particles in Various Portions of Bearing (vol. %) | | | | | | | | | Corresponding Figure |
|---|---|---|---|---|---|---|---|---|---|---|---|---|---|---|---|
| | | Pb | Sn | In | Cu | 10° | 30° | 50° | 70° | 90° | 110° | 130° | 150° | 170° | |
| Comparative Example | 1 | Rem | 10 | 10 | 2 | 0 | 0 | 0 | 0 | 0 | 0 | 0 | 0 | 0 | — |
| | 2 | Rem | 10 | 10 | — | 1.3 | 1.5 | 1.4 | 1.5 | 1.5 | 1.5 | 1.3 | 1.5 | 1.4 | — |
| | 3 | — | Rem | — | 2 | 1.2 | 1.3 | 1.2 | 1.3 | 1.4 | 1.4 | 1.3 | 1.4 | 1.4 | — |

In Comparative Example 1, the Pb alloy-plating was carried out in a borofluoride alloy plating bath, containing no hard particle 5, in the same manner as that of Example 1, thereby forming the overlay which was composed solely of Pb alloy, and had no hard particle 5 therein.

In Comparative Example 2, the plating was carried out under the same conditions as those of Example 1, and in Comparative Example 3, the plating was carried out under the same conditions as those of Example 6. At this time, the plating solution was stirred so that the hard particles could be dispersed uniformly over an entire area of a sliding surface. In Comparative Examples 2 and 3 thus prepared, the hard particles 5 were included or dispersed uniformly over the entire area of the overlay.

The foreign matter embeddability test was carried out under conditions shown in Table 2. The half bearing of each of Examples 1 to 7, having the above-mentioned hard region 4a, was combined with the half bearing of Comparative Example 1 containing no hard particle 5, and the test was carried out while applying a main load to the hard region 4a. The half bearing of each of Comparative Examples 1 to 3 was combined with the same kind of half bearing.

TABLE 2

| | Conditions of Foreign Matter Embeddability Test |
|---|---|
| Bearing dimensions | Inner diameter (53 mm) × width (26 mm) |
| Bearing pressure | 1.5 MPa |
| Number of revolutions | 3,600 rpm |
| Lubricating oil | SAE20 |
| Lubricating oil temperature | 100° C. |
| Foreign matters | Sand (50 to 150 μm) 30 mg/L |
| Material of shaft | SCM440 |
| Test time | 60 minutes |
| Evaluation method | The weight of the bearing was measured before and after the test, and the evaluation was done in terms of the amount of wear of the bearing. |

Results the test are shown in Table 3. Comparative Examples 2 and 3 were seized 8 minutes and 5 minutes, respectively, after the test was started, and therefore the test stopped. The amounts of wear, developing respectively in Comparative Examples 2 and 3 for a short time period until the test was stopped, were extremely large on the order of 13 mg and 11 mg, respectively, and it could be confirmed that the abnormal wear had developed in these Comparative Examples.

TABLE 3

| | | Results of Foreign Matter Embeddability Test Wear Amount (mg) |
|---|---|---|
| Example | 1 | 12 |
| | 2 | 15 |
| | 3 | 14 |
| | 4 | 12 |
| | 5 | 13 |
| | 6 | 13 |
| | 7 | 12 |
| Comparative Example | 1 | 25 |
| | 2 | 13 (Seizure developed in 8 min.) |
| | 3 | 11 (Seizure developed in 15 min.) |

The 60-minute test for Comparative Example 1 was finished without causing any seizure, but this Comparative Example exhibited a large amount of wear on the order of 25 mg.

On the other hand, the 60-minute test for Examples 1 to 7 was finished without causing any seizure, and the amount of wear of these Examples was small on the order of 12 to 15 mg.

Figure 6:
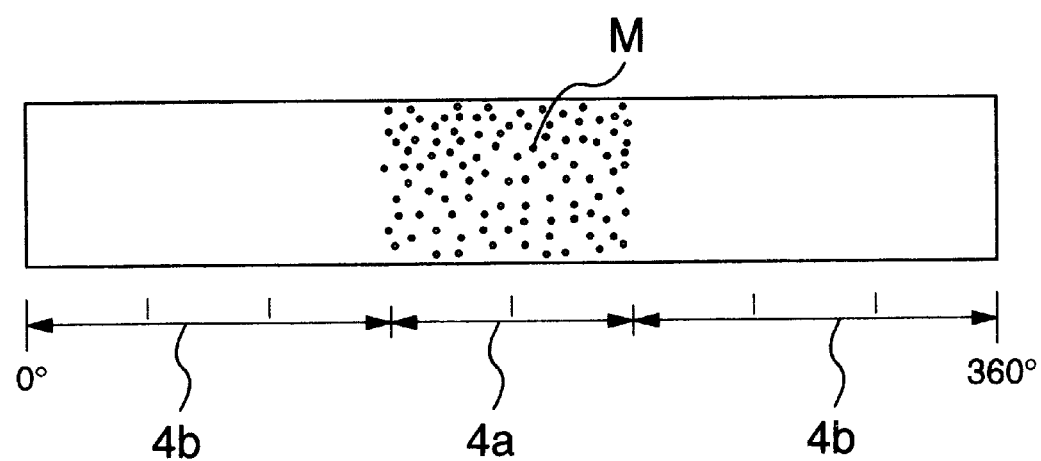
FIG. 6 shows a schematic, developed view of another embodiment of a cylindrical plain bearing.
Figure 7:
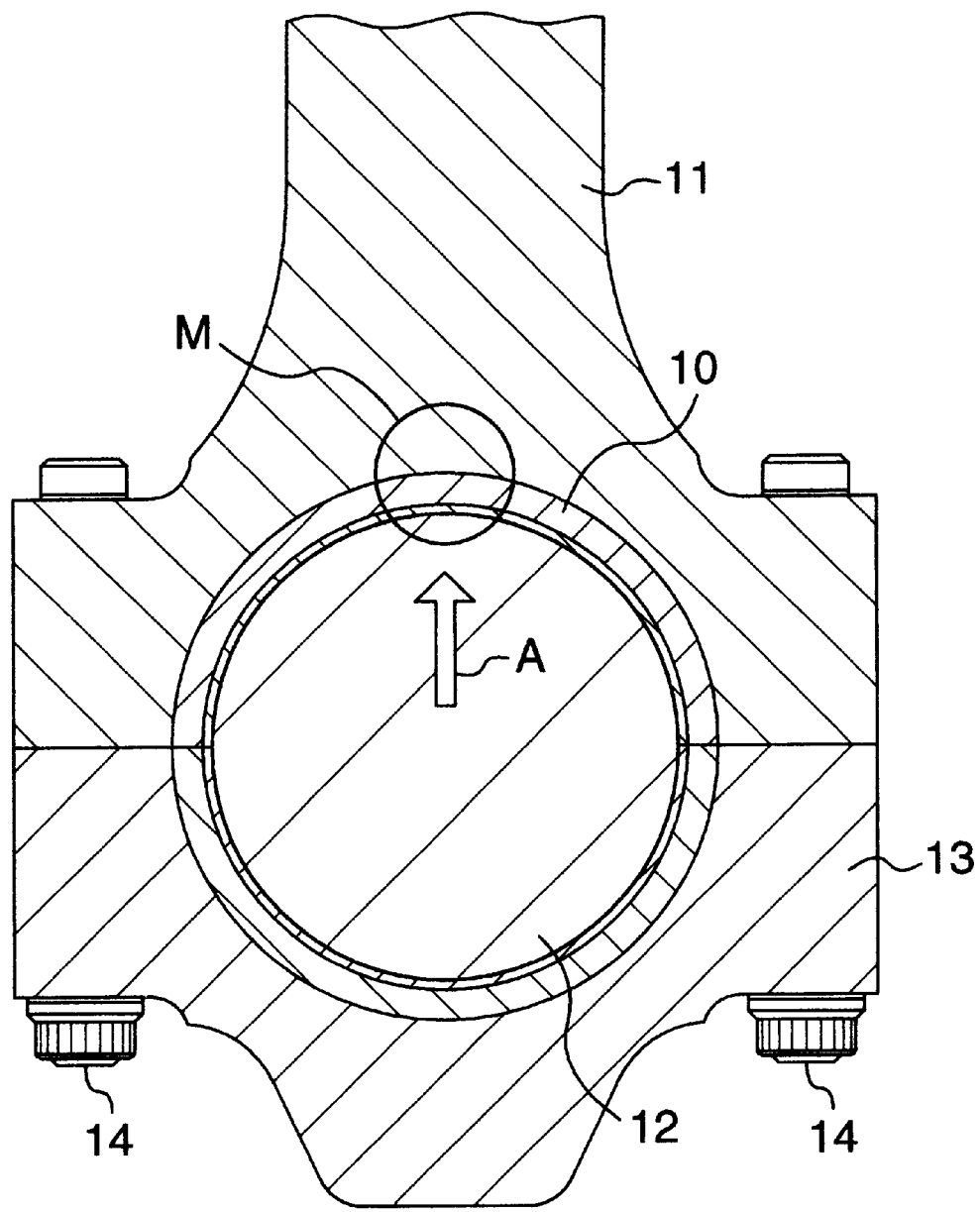
FIG. 7 shows a cross-sectional view of a housing, showing a main load portion.

Although the half bearings 1 of the invention have been described above, the present invention is not limited to the half bearing, but can be applied to a cylindrical bearing as shown in FIG. 6. In this case, a hard region 4a is formed over a range or area which corresponds to a main load portion.

In the above embodiment, although the overlay is composed of the Pb alloy, the overlay can be composed of Sn base alloy or Al base alloy.

What is claimed is:

1. A plain bearing having an overlay of soft metal composed of Pb, Sn, Al, or an alloy comprising one of these metals as a main component and formed on an inner surface of a bearing alloy layer;

wherein 0.3 to 25 vol. % of hard particles, having a hardness greater than said soft metal and a mean particle diameter of not more than 1.5 μm, are dispersed in a main load portion of said overlay, so that said main load portion is formed into a hard region harder than the other portion of said overlay.

2. A plain bearing according to claim 1, in which said plain bearing is constituted by two half bearings, and said hard region is formed on that half bearing for bearing a main load.

3. A plain bearing according to claim 1, in which said hard region is formed over an area within 120° in a direction of a circumference of said plain bearing.

4. A plain bearing according to claim 3, in which said plain bearing is constituted by two half bearings, and said hard region is formed on that half bearing for bearing a main load.

5. A plain bearing according to claim 1, in which said plain bearing is constituted by two half bearings, and said hard region is formed on that half bearing for bearing a main load.

6. The plain bearing of claim 1 wherein said hard particles are dispersed in said main load portion in a concentration which is greater at a central part thereof, and which diminishes progressively from said central part toward said other portion of said overlay.

7. The plain bearing of claim 1 wherein said overlay has a substantially uniform thickness.

8. The plain bearing of claim 1 wherein said hard particles are selected from the group consisting of nitrides, carbides, fluorides and sulfides.

9. The plain bearing of claim 8 wherein said hard particles are selected from the group consisting of BN, TiN, $Si_3N_4$, SiC, TiC, $B_4C$, TaC, CF, $CaF_2$, $MoS_2$ and $WS_2$.

* * * * *